Sept. 22, 1970   E. G. SCHWARM   3,530,366
MAGNETO SYSTEMS
Filed Feb. 19, 1968
2 Sheets-Sheet 2
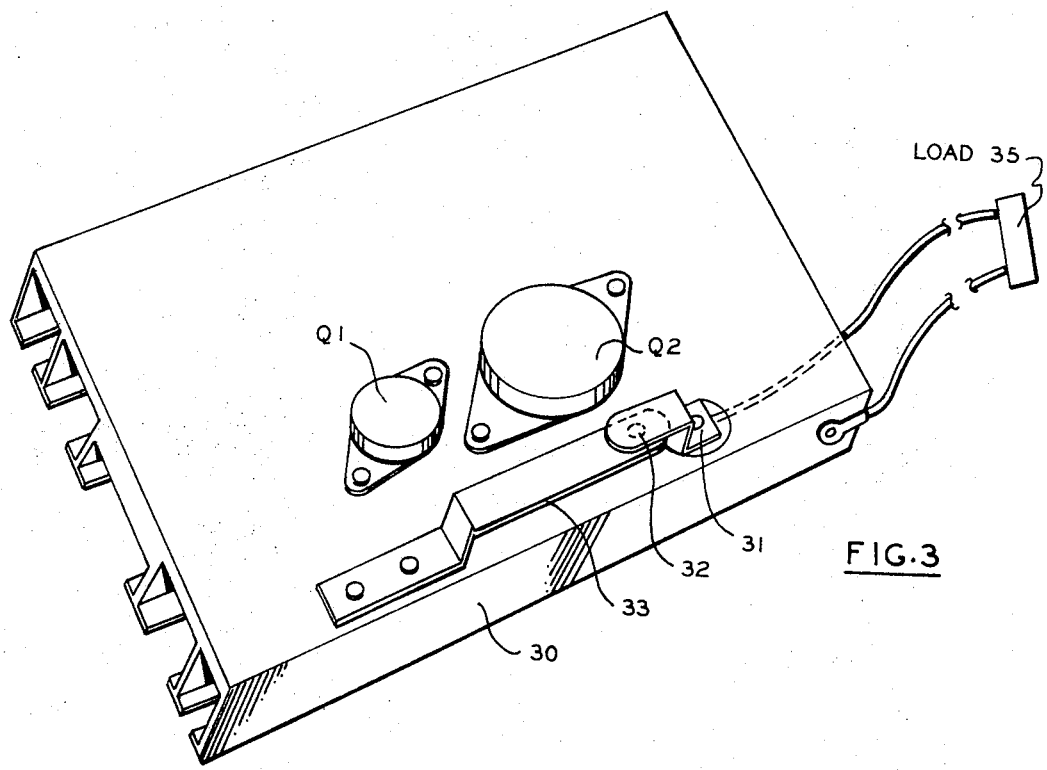
FIG. 3
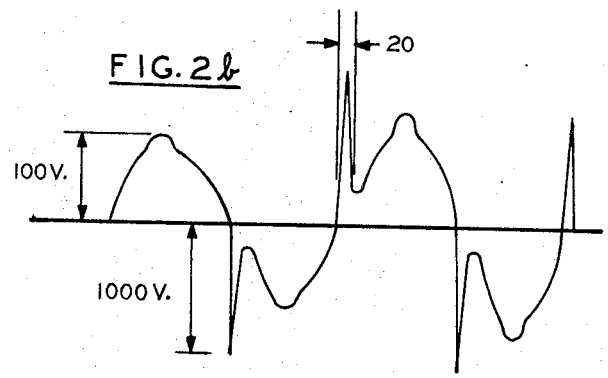
FIG. 2b
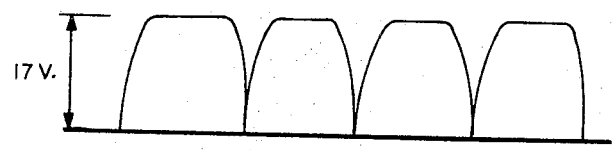
FIG. 2c
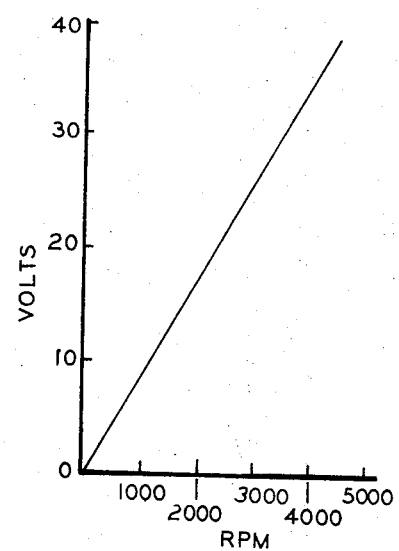
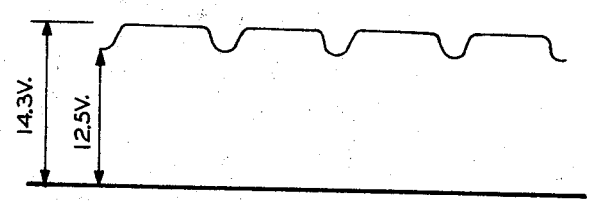
FIG. 2d
INVENTOR.
EDWARD G. SCHWARM
BY Richard R. Stephens
ATTORNEY United States Patent Office 3,530,366
Patented Sept. 22, 1970

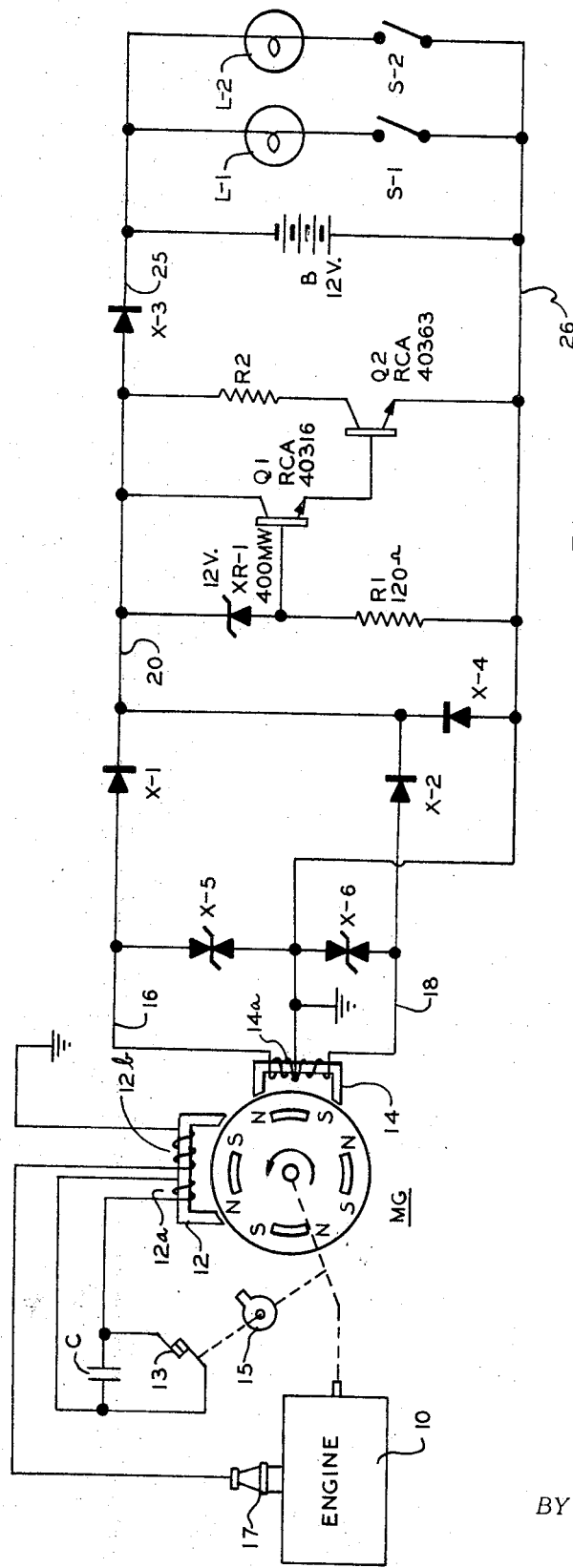

3,530,366
MAGNETO SYSTEMS
Edward G. Schwarm, Acton, Mass., assignor, by mesne assignments, to Culver-Stearns Manufacturing Company, Inc., Worcester, Mass., a corporation of Massachusetts
Filed Feb. 19, 1968, Ser. No. 706,555
Int. Cl. H02p 9/00; G05f 5/00
U.S. Cl. 322—28                                    8 Claims

ABSTRACT OF THE DISCLOSURE

A regulated electrical power system for a machine having a magneto-generator driven at widely-varying speeds by an internal combustion engine, where the magneto-generator provides power for both ignition and lights and battery-charging. The system includes rectifier means for rectifying the magneto output, a Zener diode circuit for sensing rectified voltage level and transistor current amplifier means which draws current through a load resistor when the rectified voltage exceeds a predetermined level, thereby reducing the rectified voltage level due to increased drop across the internal impedance of the magneto-generator.

---

A variety of vehicles, such as motorcycles and snowmobiles, and various other devices such as outboard motor boats driven by small internal combustion engines require the generation of electrical energy for engine ignition, for illumination of headlights and other lights, and for the charging of a storage battery to power various other accessories, such as horns, engine-starting motors, and the like. Economy, space, weight and other considerations often dictate that a single generator driven by the engine provide all such electrical power. A common arrangement in such systems involves the use of a rotating permanent magnet generator, or magneto, coupled to the engine shaft. The magneto is provided with one coil which supplies the relatively high voltage required for ignition, and a second coil which provides a lower voltage to illuminate lamps and charge the storage battery of the system. The constant flux provided by permanent magnets makes the output voltage from either coil vary directly with engine speed, and the engine speed obviously must vary widely during the operation of many such devices in order to vary vehicle speed. When electric lamps are operated directly from the output of a magneto coil without being connected in parallel with a storage battery, the lamps usually are too dim at low engine speeds or tend to burn out too quickly at high engine speeds. The charging of a storage battery from the output of a magneto (although a rectifier) also is adversely affected by changes in engine speed, so that the battery tends to be over-charged at high speeds and/or insufficiently charged at low engine speeds. Use of a high inductance coil in the magneto compensates in some measure for engine speed variation, but only to a limited degree, and it is not practical merely to attempt to increase the inductance of the magneto coil by providing more turns on the coil, as that would undesirably raise the magneto open-circuit output voltage, cause wide variation of voltage with load, and because the magneto then would tend to charge the battery on a constant-current basis, severe battery over-charging would occur. The difficulties attending lamp operation and battery charging from a magneto driven by an internal combustion engine have been so formidable in the past that many engine-driven systems using magnetos for ignition have included a separate shunt generator for lamp operation and battery charging. A primary object of the present invention is to provide an engine-driven magneto-generator electrical system which will provide constant output voltage over a wide range of speeds to assure uniform lamp operation and proper battery charging, with proper tapering of battery charging current as a fully charged condition is approached.

Inexpensive magnetos are used rather than shunt generators in the above-mentioned applications, both for sake of economy and to minimize maintenance problems associated with automobile-type voltage regulators and the brushes of shunt generators. Such magnetos are of simple construction and ordinarily provide extremely noisy and non-sinusoidal output waveforms, often with large voltage spikes of great amplitude. Both the amplitudes and time-widths of the spikes vary with engine speed and with the electrical load supplied by such a magneto. The rise and fall rates and the time widths of such spikes are such that no elecromechanical relay voltage regulator of the automobile type is capable of fast enough response to provide adequate regulation of these magneto-powered systems. Thus it is another object of the invention to provide an engine-driven magneto-generator powered system which is regulated with sufficient response speed so that large transient spikes provided by the generator are not applied to the loads fed by the magneto generator.

Extremely important requirements in such applications are that the system be very inexpensive, that it require only a few parts, and that it not require frequent maintenance or adjustment. The fact that magneto generators usually provide very sharp high voltage spikes complicates the design of a workable system, as such spikes have amplitudes sufficient to damage many transistors. Thus it is another important object of the invention to provide a regulated magneto-powered electrical system which is extremely inexpensive and trouble-free and which will not be damaged by the transient voltage spikes which ordinarily occur in magneto-generator output waveforms.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which:

FIG. 1 is a schematic diagram illustrating a preferred form of the present invention.

FIG. 2a is a graph illustrating the no-load output voltage versus speed characteristic of a typical magneto generator.

FIG. 2b is a diagram showing the open-circuit waveform of a typical magneto generator at a representative rotating speed.

FIGS. 2c and 2d are waveform diagrams showing the output voltage of the system under conditions (1) wherein a storage battery is not connected in parallel with the loads, and (2) wherein a storage battery is connected in parallel with the loads.

FIG. 3 is an isometric view showing the transistors used in the invention mounted on a heat sink, together with an optional automatic thermally-responsive switch which functions to decrease dissipation in the transistors when the temperature of the heat sink exceeds a safe value.

In FIG. 1 internal combustion engine 10 may comprise a gasoline internal combustion engine which furnishes the tractive power for a motorcycle or snowmobile or like device, and the speed of the engine is assumed to be controllable by an operator, by means of a conventional throttle control (not shown) to vary the speed of engine 10 between a maximum upper speed and some minimum low speed below which the engine will stall. Typical maximum speeds may be of the order of 6000 r.p.m. for example. In many of the applications for which the invention is best suited the engine will be of the two-cycle type, although that is not a requirement of the invention. The shaft of engine 10 is mechanically directly connected to drive the rotor of magneto generator MG, to sweep a plurality of magnets on the rotor past a pair of magneto armature cores 12 and 14. As each permanent magnet passes each armature the direction of flux through the armature will be seen to be alternated, thereby inducting alternating voltages in the coils 12a, 14a surrounding the armature cores. It is apparent from Lenz's law $$\left(e = n\frac{d\phi}{dt}\right)$$

that the constant flux provided by the permanent magnets will result in induced voltages which are directly proportional to engine speed. In FIG. 2a the RMS value no-load output voltage variation with speed of such a magneto is plotted as curve #1. With a given inductance and a given resistance in each armature coil, it will be seen that the internal impedance of each armature circuit also will tend to increase with increases in engine speed due to the increased armature circuit reactance at higher frequencies. However, since each armature circuit inherently includes substantial resistance as well as inductance, the increase in reactance is inherently incapable of wholly compensating for the increase in induced voltage, so that the amplitude of the output voltage from each armature coil varies substantially with engine speed.

Armature core 12 is shown as including a primary winding 12a and a high-voltage secondary winding 12b. Primary winding 12a is connected in parallel with a pair of conventional breaker points 13 and an ignition capacitor C. Breaker points 13 are opened by cam 15 at the desired ignition time, which is arranged to occur during a large or maximum rate-of-change of flux condition in core 12. The high voltage induced in secondary winding 12b is shown applied directly to a spark plug 17. Multi-cylinder engines may include a distributor (not shown) in the coil 12b circuit. An alternative type of system includes a single coil on magnetic circuit 12 to generate an intermediate voltage, which is applied to a separate ignition coil transformer (not shown) to generate the high voltage required for ignition. The invention is equally applicable to both types of systems. Magneto MG of FIG. 1 is a conventional magneto providing both ignition and accessory outputs, and may comprise, for example the widely-used type of magneto generator manufactured by Robert Bosch G.m.b.H. and having a 75-watt rating. The open-circuit waveform of such a magneto-generator at a representative speed is shown in FIG. 2b, and it will be seen to be very non-sinusoidal, with many harmonics, and to include extremely large-amplitude transient voltage spikes of short duration. These sharp transients are caused by pole face and magnet shapes which give high efficiency but sharp changes in magnetic flux. While the generation of very sharp high-voltage spikes is beneficial for providing ignition current to the engine spark plugs, it is undesirable to have such spikes occur in the magneto coil connected to drive lights and other devices and to charge the battery.

Coil 14a in which the accessory system alternating voltage is induced is preferably center-tapped to provide two alternating voltages of equal amplitude and opposite polarity on lines 16 and 18. If desired, a pair of bi-directional high-voltage Zener diodes X-5 and X-6 may be connected across each of these alternating voltages to conduct only upon the occurrence of large induced voltage spikes, for the purpose of protecting further semiconductors from damage. In many embodiments of the invention diodes X-5 and X-6 may be eliminated, as will be discussed further below.

The alternating output voltages on lines 16 and 18 are applied to diode rectifiers X-1 and X-2, thereby providing a full-wave rectified DC voltage between terminal 20 and ground, with terminal 20 positive with respect to ground. In applications requiring less current, coil 14a need not be center-tapped and a single rectifier may be used to provide half-wave rectification. The voltage on line 20 is shown connected through a further diode X-3 to a plurality of loads shown as comprising battery B, and lamps L1 and L2, which are selectively energized by control of switches S1 and S2. The magnitude of the rectified DC voltage which will appear on line 20 at any given engine speed will be seen to depend upon the current drawn by the various loads, with increasing load current causing increased drop across the internal impedance of coil 14a and a decreasing output voltage. The circuit of FIG. 1 operates to limit the output voltage on line 20, and hence the output voltage on line 22, by diverting substantial current through resistor R2 and transistor Q1 when the voltage on line 20 tends to exceed a predetermined level.

The rectified voltage on line 20 is applied across Zener regulator diode XR-1 and resistor R1. The injunction point 22 between diode XR1 and resistor R1 is connected to the base of transistor Q1. The emitter of transistor Q1 is connected directly to the base of transistor Q2. When the output voltage on line 20 is below a value (determined by the breakdown voltage of diode XR-1), an insignificant current which is approximately $(1+h_{FE})$ times the Q1 remains cutoff, and transistor Q2 then also will be cutoff. When the voltage on line 20 begins to exceed a predetermined level, however, the breakdown of diode XR-1 begins to provide substantial additional current through XR-1. Because of the large resistance of R1, substantially all of the additional current will be seen to flow through the base-emitter circuit of Q1 and then through the base emitter circuit of Q2 to ground. The flow of base current in Q1 will turn on transistor Q1, providing a Q1 collector current which is approximately $(1+h_{FE})$ times the Q1 base current. The amplified emitter current from Q1 applied to the base of Q2 provides further current amplification, so that a relatively large current may be diverted through R2 and Q2 upon a small change in voltage on ilne 20. Regulator diode XR-1, the base-emitter junction of transistor Q1, and the base-emitter junction of transistor Q2 will be seen to be connected in series from terminal 20 to ground. The precise predetermined level at which transistors Q1 and Q2 are turned on will be seen to depend not only upon the breakdown voltage of diode XR-1, but also upon the base-emitter junction voltages of transistors Q1 and Q2. Whenever the voltage on line 20 varies upwardly from the sum of the XR-1 breakdown voltage plus the Q1 and Q2 base-emitter junction voltages, the current through Q2 will be varied to correct the variation. If regulation is desired to occur at a higher voltage level than that of the mentioned sum, one or more diodes (not shown) may be connected in their forward direction in the mentioned series circuit. A typical silicon-junction diode has a forward drop or threshold of 0.5 to 0.7 volt.

With low capacitance or non-capacitive loads as shown, it will be appreciated that the rectified voltage on line 20 will be a pulsating one. Because the XR-1, Q1, Q2 circuit shown is direct-coupled, it will be seen that regulation occurs with no time delay. FIGS. 2c and 2d illustrate the waveform of the output voltage between lines 25 and 25 under typical operating conditions in specific embodiments of the invention, FIG. 2c showing a DC output having a peak value of 17 volts and an average value of 12.1 volts, under 4 ampere load conditions in which no battery is connected between conductors 25, 26 and in which Zener diode XR-1 has a 16.7 volt breakdown rating, while FIG. 2d shows the comparable waveform of an arrangement having a battery connected in parallel with the load, with a Zener diode having a slightly smaller breakdown voltage (13.55 volts). The average value of the waveform in FIG. 2d was approximately 14.25 volts. It will be appreciated that the invention is readily applicable to systems using a variety of different operating voltages.

In most applications of the invention, the regulator circuit is arranged so that Q2 will draw current at a somewhat higher voltage than the fully-charged open-circuit voltage of battery B, so that the regulator will not draw current from the battery when the engine and the magneto are stopped. Diode X3 may be added however, even in such applications, as a safety measure, to prevent battery discharge when the engine is stopped even if a component of the regulating circuit should fail.

Diodes X–5 and X–6 may be omitted if diodes X–1 and X–2 are capable of withstanding the large voltage spikes which sometimes occur in magneto generator output waveforms. However, such transients then would appear across diode XR–1 and transistors Q1 and Q2 when X–1 or X–2 broke down in the reverse direction, possibly damaging these parts, were it not for the provision of diode X–4. The reverse breakdown voltage of diode X–4 is selected to be well above the regulating voltage level at which transistor Q2 conducts, so that diode X–4 performs no function when a large positive transient occurs on line 20. Upon the occurrence of a large negative transient, however, diode X–4 conducts and shorts the negative transient to ground.

During ordinary applications of the invention, the regulator begins to draw current through Q2 and R2 whenever the magneto peak voltage exceeds the regulating level, and the higher the magneto open-circuit voltage tends to become, the more current there is diverted through Q2 and R2. Transistor Q2 and resistor R2 both are selected to have adequate power ratings. During light electrical load conditions transistor Q2 and resistor R–2 will be seen to be required to dissipate more power at a given engine speed than during heavy electrical load conditions. Much of the time transistor Q2 and resistor R–2 will be required to draw current only during brief peak portions of each magneto alternating output voltage cycle, so that their power dissipation requirements are not severe in practice.

Transistors Q1 and Q2 are preferably mounted on a metal heat-sink shown in FIG. 3 as comprising an aluminum extrusion 30 having a plurality of fins to increase he surface area and hence the thermal radiation from the heat sink. Transistors Q1 and Q2 are shown in FIG. 3 with their outer casings tightly affixed to heat sink 30, and the transistor leads (not shown) extend through holes (not shown) in the heat sink to be connected to other components. All of the diodes and resistors shown in FIG. 1 may be mounted on heat sink 30 with conventional terminals and fasteners, preferably with resistor R2 spaced from the heat sink so that power dissipated in resistor R2 will tend less to raise the temperature of the heat sink. Also shown provided on heat sink 30 as an optional feature are a pair of electrical contacts, including a stationary contact 31 insulated from heat sink 30 and a movable contact 32 carried on the end of bi-metallic strip 33. Bi-metal strip 33 is welded or otherwise fastened to heat sink 30. When large amounts of power dissipation in transistor Q2 raise the temperature of sink 30 sufficiently, closure of contacts 31, 32 connects a resistive load 35 mounted remotely from the heat sink across the output terminals of the system, thereby providing increased load and lessening the amount of power which Q2 and R2 are required to dissipate. Load 35 may comprise an ordinary resistor, if desired, or alternatively, switch contacts 31, 32 may be connected in parallel with one of the switches S–1 or S–2 of FIG. 1, so that closure of the thermostat contacts connects a lamp as the added load. The latter connection has the disadvantage, of course, that no additional load will be connected to the system by the thermostat switch if the switch connected in parallel with contacts 31, 32 is already closed when the high temperature condition is encountered. It will be apparent that plural thermostatic switches may be used to connect in plural loads, if desired.

In applications requiring less regulation, transistor Q1 may be omitted, and the junction between regulator diode XR–1 and resistor R–1 tied directly to the Q2 base. Diode XR–1 must be capable of dissipating sufficient power in such an arrangement of course, to furnish adequate base current to Q2 to achieve the desired regulation.

It will thus be seen that the objects set forth above, among those made apparent from the preceding changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

What is claimed is:

1. An electrical power system for a machine powered by a variable-speed internal combustion engine, comprising, in combination: a magneto-generator having a rotor connected to be driven by said variable-speed engine, permanent-magnet field means, and first and second armature coils; first circuit means connecting said first armature coil to supply ignition current for said internal combustion engine; an electrical load; and second circuit means including rectifying and regulating means for connecting said second armature coil to provide direct operating voltage to said electrical load, said rectifying and regulating means including diode rectifier means connected in series with said second coil to provide a direct voltage between first and second conductors; Zener diode means for sensing the magnitude of said direct voltage between said conductors and for providing a first current signal when said voltage between said conductors tends to exceed a predetermined reference level; and current-amplifier means connected between said conductors, connected to be responsive to said first current signal, and operative to pass current between said conductors upon occurrence of said first current signal.

2. A system according to claim 1 in which said current-amplifier means includes a first transistor having a base terminal and collector and emitter electrodes, a load impedance, third circuit means connecting said electrodes and said load impedance in series between said conductors, and further means responsive to said first current signal for applying current to said base terminal of said first transistor.

3. A system according to claim 1 in which said current amplifier means comprises first and second transistors each having a base terminal and collector and emitter terminals, third circuit means connecting said Zener diode means and the base-emitter junctions of said transistors all in series between said conductors; and fourth circuit means including a load impedance connected in series with the collector-emitter circuit of one of said transistors between said conductors.

4. A system according to claim 1 in which said Zener diode means comprises a Zener diode and a resistance connected in series between said conductors thereby to provide said first current signal at the junction between said Zener diode and said resistance, said current amplifier means having an input circuit connected between said junction and one of said conductors.

5. A system according to claim 1 having a further diode connected in reverse polarity relationship between said conductors, said further diode having an inverse breakdown voltage level in excess of said predetermined reference level.

6. A system according to claim 1 in which said electrical load includes an electric storage battery, and in which said system includes a further diode, said storage battery and said further diode being connected in series between said conductors.

7. A system according to claim 2 in which said further means comprises a second transistor having a base terminal and collector and emitter electrodes, the base terminal of said second transistor being connected to receive said first current signal, one of said electrodes of said second transistor being connected to one of said conductors, and the other of said electrodes of said second transistor being connected to the base terminal of said first transistor.

8. Voltage regulator apparatus, comprising, in combination: voltage source means having an internal source impedance for providing a rectified voltage between first and second conductors, said rectified voltage including periodic large transient voltage spikes and large variations in average amplitude; a load circuit connected to said first and second conductors; a transistor having a base terminal and collector and emitter terminals; a Zener diode and a resistance connected in series between said conductors, circuit means connecting said Zener diode and the base-emitter junction of said transistor in series between said conductors, and a load resistor connected in series with the collector-emitter circuit of said transistor between said conductors, whereby excursion of the voltage between said conductors above a level determined by the sum of the Zener voltage of said Zener diode and the base-emitter junction voltage of said transistor causes current to be drawn through said collector-emitter circuit and said load resistor, thereby limiting the output voltage between said conductors.

References Cited

UNITED STATES PATENTS

| | | | |
|---|---|---|---|
| 3,059,169 | 10/1962 | Raver et al. | 322—98 X |
| 3,260,917 | 7/1966 | Shimwell et al. | 320—39 X |
| 3,341,763 | 9/1967 | Noddin | 322—91 X |
| 3,377,486 | 4/1968 | Benezech | 322—90 X |
| 3,402,325 | 9/1968 | Minks | 320—39 X |

ORIS L. RADER, Primary Examiner

H. HUBERFELD, Assistant Examiner

U.S. Cl. X.R.

322—90, 91; 323—22